(12) United States Patent
Stanforth et al.

(10) Patent No.: US 8,504,087 B2
(45) Date of Patent: Aug. 6, 2013

(54) SYSTEM AND METHOD FOR CONTROLLING ACCESS TO SPECTRUM FOR WIRELESS COMMUNICATIONS

(75) Inventors: Peter Stanforth, Winter Springs, FL (US); Hrishikesh Gossain, Heathrow, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 350 days.

(21) Appl. No.: 12/971,622

(22) Filed: Dec. 17, 2010

(65) Prior Publication Data

US 2012/0157144 A1    Jun. 21, 2012

(51) Int. Cl.
   *H04W 72/10*    (2009.01)

(52) U.S. Cl.
   USPC ......... 455/512; 455/454; 455/509; 455/452.1

(58) Field of Classification Search
   USPC ............... 455/452.1, 434, 422.1, 452.2, 453, 455/454, 509, 515, 67.11, 512; 370/328, 370/322, 329, 337
   See application file for complete search history.

(56) References Cited

U.S. PATENT DOCUMENTS

| | | | |
|---|---|---|---|
| 5,608,727 A | 3/1997 | Perreault et al. | |
| 5,729,531 A | 3/1998 | Raith et al. | |
| 6,327,254 B1 * | 12/2001 | Chuah | 370/328 |
| 7,088,997 B1 | 8/2006 | Boehmke | |
| 2004/0028003 A1 | 2/2004 | Diener et al. | |
| 2004/0087310 A1 | 5/2004 | Williamson et al. | |
| 2006/0083205 A1 | 4/2006 | Buddhikot et al. | |
| 2006/0218392 A1 | 9/2006 | Johnston | |
| 2006/0234713 A1 | 10/2006 | Oswal et al. | |
| 2006/0262768 A1 | 11/2006 | Putzolu | |
| 2007/0047478 A1 * | 3/2007 | Balachandran et al. | 370/328 |
| 2007/0274404 A1 | 11/2007 | Papandriopoulos et al. | |
| 2008/0052387 A1 | 2/2008 | Heinz et al. | |
| 2008/0108365 A1 | 5/2008 | Buddhikot et al. | |
| 2008/0151743 A1 | 6/2008 | Tong et al. | |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0017761 A1 | 1/2009 | Li et al. | |
| 2009/0046625 A1 | 2/2009 | Diener et al. | |
| 2009/0197627 A1 | 8/2009 | Kuffner et al. | |
| 2009/0238090 A1 | 9/2009 | Sambhwani et al. | |

OTHER PUBLICATIONS

FCC 08-260, Second Report and Order and Memorandum Opinion and Order, Adopted Nov. 4, 2008 and Released Nov. 14, 2008.

(Continued)

*Primary Examiner* — John J Lee
(74) *Attorney, Agent, or Firm* — Renner, Otto, Boisselle & Sklar, LLP

(57) ABSTRACT

A method and system for controlling access to a spectrum resource by radio devices that are grouped into a first class and a second class, the first class having higher priority to the spectrum resource than the second class. The control techniques include setting a weight for each radio device in each class of radio devices; setting a threshold for each class of radio devices; aggregating the weights of radio devices that use the spectrum resource; and determining if the aggregate weight crosses the threshold for one of the classes of radio devices and, if so, denying access to the spectrum resource for additional radio devices belonging to the class of radio devices associated with the crossed threshold.

20 Claims, 3 Drawing Sheets

OTHER PUBLICATIONS

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

International Search Report and Written Opinion from corresponding International Application No. PCT/US11/64773, dated Apr. 12, 2012.

Jones, Steven K. et al., "Initial Evaluation of the Performance of Prototype TV-Band White Space Devices", (2007), OET Report, FCC/OET 07-TR-1006.

47 C.F.R. 15.713, at Jan. 4, 2012.

By the Commission, "Second Report and Order, Order on Reconsideration, and Second Further Notice of Proposed Rulemaking", Federal Communications Commission, 2004, FCC 04-167, pp. 1-180.

Kwerel, Evan et al., "A Proposal for a Rapid Transition to Market Allocation of Spectrum", Federal Communications Commission, 2002, OPP Working Paper No. 38, pp. 1-50.

Prabhu, Krish et al., "Time for Action" Genuine Ideas, 2002, [retrieved online Feb. 1, 2008], <http://www.genuineideas.com/ArticlesIndex/TimeForAction.htm>.

\* cited by examiner

SYSTEM AND METHOD FOR CONTROLLING ACCESS TO SPECTRUM FOR WIRELESS COMMUNICATIONS

TECHNICAL FIELD OF THE INVENTION

The technology of the present disclosure relates generally to controlling access spectrum for wireless communications and, more particularly, to a system and method for sharing network or channel access among multiple classes of users with improved priority handling for at least one user class.

BACKGROUND

Wireless electronic devices, especially those with a high degree of portability while in use, are becoming increasingly popular. Wireless electronic devices, also referred to radio devices, may include mobile telephones, voice radios (e.g., push-to-talk devices and devices used by emergency responders), computing devices (e.g., laptop computers, tablet devices, and personal digital assistants), gaming devices, and so forth.

A challenge for these devices is providing reliable, high speed network access. This challenge is sometimes not caused by a lack of resources, but rather by an inefficient management and/or allocation of access to spectrum resources for wireless communications since spectrum tends to be segmented into artificial categories. One example may be found in the way spectrum for mobile telephone service providers is allocated where spectrum licensed to a first provider is completely separate (e.g., in frequency) from spectrum licensed to a second provider. Another example may be found in the way that public safety agencies (e.g., police, fire, ambulance, homeland security, etc.) are allocated spectrum that is completely separate from spectrum licensed to a commercial network operator.

In simple terms, the challenge may be described with respect to FIG. 1, which shows a chart of spectrum reliability versus cost. Typically, to gain high reliability, one must pay a higher cost (e.g., by licensing spectrum for one's own use). But users desire the highest reliability possible at the lowest cost to access the resource, and/or may not be interested in licensing spectrum. In this sense, users will attempt to gravitate to the top left of the diagram. But users with a pressing need for spectrum will be pushed toward the right of the diagram.

Another underlying issue is that many spectrum licensees may have excess capacity but are unwilling to allow others to use the spectrum in case a need for the spectrum arises. For instance, commercial network service providers, such as mobile telephone service providers, may be able to support more radio devices in a location than the service provider ordinarily services. Another example is that emergency responders may have spectrum use rights that are under-utilized, sometimes even during limited periods of time when an emergency event occurs.

SUMMARY

To improve spectrum access, the present disclosure describes systems and methods of controlling access to spectrum in accordance with a weighted aggregate of the total number of users of the spectrum.

According to one aspect of the disclosure, a method of controlling access to a spectrum resource by radio devices that are grouped into a first class and a second class, the first class having higher priority to the spectrum resource than the second class, includes setting a weight for each radio device in each class of radio devices; setting a threshold for each class of radio devices; aggregating the weights of radio devices that use the spectrum resource; and determining if the aggregate weight crosses the threshold for one of the classes of radio devices and, if so, denying access to the spectrum resource for additional radio devices belonging to the class of radio devices associated with the crossed threshold.

According to another aspect of the disclosure, a spectrum access management system configured to control access to a spectrum resource by radio devices that are grouped into a first class and a second class, the first class having higher priority to the spectrum resource than the second class, includes a memory for storing and a processor for executing a program that contains logical instructions to set a weight for each radio device in each class of radio devices; set a threshold for each class of radio devices; aggregate the weights of radio devices that use the spectrum resource; and determine if the aggregate weight crosses the threshold for one of the classes of radio devices and, if so, deny access to the spectrum resource for additional radio devices belonging to the class of radio devices associated with the crossed threshold.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Figure 1:
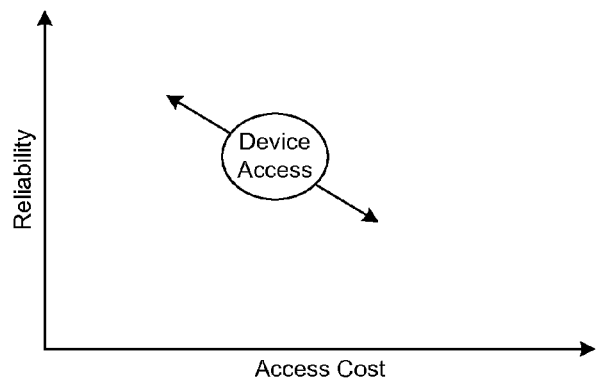
FIG. 1 is a graph of spectrum reliability versus cost.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Introduction

The systems and methods described in this document are configured to make spectrum for wireless communications readily available to, or shared among, multiple classes of devices, while reserving availability of service and quality of service to higher priority users. One exemplary class may include devices that have an existing permission right to use the spectrum in question, such as by way of a subscription, a license or some other designation granted by an operator of a network. Another exemplary class may include, devices that are allowed to have access to the spectrum in question but do not have an innate permission right to use the spectrum, and have a lower priority than the class with devices having an existing permission right. As a more tangible example, the spectrum in question may be spectrum allocated to public safety personnel, a first class of devices may be devices used by the public safety personnel, and a second class of devices may be devices used by commercial users. The commercial users may be individuals or enterprises that carry out wireless communications for personal or business reasons, and also may be referred to general users or the public. For instance, a multiuse light terminating equipment (LTE) system may be deployed for use by public safety personnel using 20 MHz of public safety spectrum (or some other bandwidth of spectrum) that may be shared with mobile telephones under the techniques described in this document.

In another example, the spectrum in question may be spectrum allocated to a commercial network operator, such as a mobile (e.g., cellular) telephone service provider. In this example, a first class of devices may be devices used by subscribers of the commercial network operator and a second class of devices may be commercials users that are not subscribers. In still another example, the spectrum in question may be spectrum allocated to national defense, a first class of devices may be devices used by national defenders (e.g., the military), and a second class of devices may be devices used by commercial users.

While the examples described in this document include two classes of devices, it will be understood that there may be more than two classes of devices. For instance, devices for public safety personnel may be divided in multiple classes (e.g., fire in one class and police in another class). Also, non-subscriber commercial users may be divided into multiple classes, such as one class for devices used by persons associated with an enhanced benefit and another class for devices used by the general public that do not have the enhanced benefit.

The disclosed systems and methods employ a set of metrics that balance the competing interests of radio devices, as depicted by the chart of FIG. 1, to allow or deny spectrum access depending on spectrum usage and radio class. Simply prioritizing one radio over another does not consider the context in which the radios present in a location of interest are being used. The metrics used in the following techniques take into consideration the complexities of spectrum usage and are variable. As a generalized example, a class of users that include public safety personnel may have, on average, a higher priority than the commercial users, but contextual circumstances may lead to more nuanced response by a spectrum management system.

A primary component of analyzing context of spectrum use is location. It may be assumed that the location of radio devices that operate under the described techniques is known. Many radio devices are capable of determining their own location. Almost all mobile telephones and public safety radios sold since 2009 are equipped with global positioning system (GPS) location determining technology or other mechanisms for determining their location within approximately ten to fifty meters. As another example, radios that employ spectrum sharing, such as under Federal Communications Commission (FCC) Order No. 04-186 concerning television (TV) white spaces, are required to be "location aware."

Another component of context is the type of communications in which the radio device is engaged, sometimes referred to as "application." For example, a mobile telephone or computing device may be used for voice communication, which consumes a relatively small amount of capacity, or may be used for downloading large data files (e.g., video), which consumes a relatively large amount of capacity. Of course, application is open to a wide variety of interpretations and may be further complicated to the extent that the device, or the user of the device, may participate in the definition of the application. Alternatively, a monitoring system may influence the determination of a device's application.

The described techniques are implemented to share spectrum among two or more classes of users, while providing minimum assurances about grade of service and quality of service to priority users.

Spectrum Access System

Figure 2:
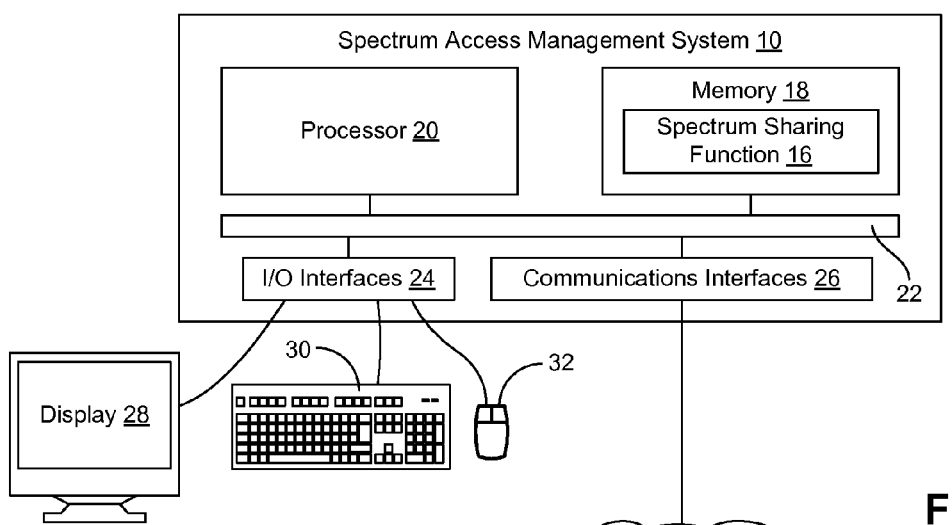
FIG. 2 is a schematic view of a system used to carry out aspects of the disclosure.
Figure 2:
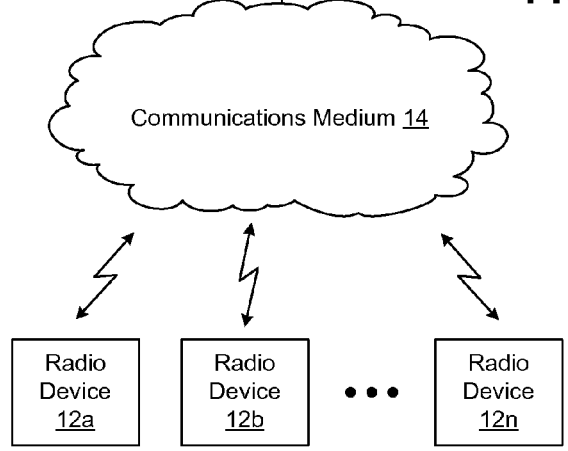

With additional reference to FIG. 2, a spectrum access management system 10 is illustrated. The spectrum access management system 10 manages spectrum usage by radio devices 12, which are labeled in FIG. 2 as radio devices 12a through 12n. The radio devices will be referred to primarily in the context of portable wireless radio communications devices, such as mobile telephones. But it will be appreciated that the radio devices 12 may be any collection of portable electronic devices and/or fixed location electronic devices, so long as the devices have wireless radio communications capability. Therefore, the techniques described in this document may be applied to any type of appropriate electronic device, examples of which include a mobile telephone, a radio communicator, a media player, a gaming device, a computer, a personal digital assistant (PDA), an electronic book reader, etc. Also, the term radio device may apply to a collection of radio devices (e.g., a network of devices) and may apply to network access points (e.g., a WiFi access point) for providing communication services to client devices.

The spectrum access management system 10 may be configured as a server that communicates with the radio devices 12 over a communications medium 14, which may include the Internet and any other networks through which the radio devices 12 may gain Internet connectivity, such as cellular telephone networks and local area networks. The spectrum access management system 10 may include a spectrum sharing function 16 to manage access to predetermined spectrum resources by the various radio devices 12. For this purpose, the radio devices 12 may store a cooperating spectrum access computer program in a non-transitory computer readable medium (e.g., a memory) and execute the spectrum access function with a processor.

The radio devices 12 may include radio communications circuitry for carrying out wireless communications. Wireless communications may include any communication functions for which the radio device 12 is configured and may include voice and/or video communications (e.g., push-to-talk functions, voice calls and/or video calls), sending and receiving messages (e.g., email messages, text messages, multimedia messages, instant messages, etc.), accessing the Internet or other network, etc. For some radio devices 12, the communications may include providing network or communications connectivity for other devices that are clients of the radio devices 12. The communication protocols employed by the radio devices 12 are not germane to the disclosed techniques for managing spectrum access.

The spectrum sharing function 16 may be embodied as a set of executable instructions (e.g., code, a program, or software) that is resident in and executed by the spectrum access management system 10. The function 16 may be a program that is stored by a non-transitory computer readable medium, such as one or more memory devices (e.g., an electronic memory, a magnetic memory, or an optical memory). In the following description, ordered logical flows for the functionality of the spectrum sharing function 16 are described. But it will be appreciated that the logical progression may be implemented in an object-oriented manner or a state-driven manner.

The spectrum access management system 10 may be implemented as a computer-based system that is capable of executing computer applications (e.g., software programs), including the spectrum sharing function 16. The spectrum sharing function 16, and an affiliated spectrum information database, may be stored on a non-transitory computer readable medium, such as a memory 18. The memory 18 may be a magnetic, optical or electronic storage device (e.g., hard disk, optical disk, flash memory, etc.), and may comprise several devices, including volatile and non-volatile memory components. Accordingly, the memory 18 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices. To execute the spectrum sharing function 16, the spectrum access management system 10 may include one or more processors 20 used to execute instructions that carry out logic routines. The processor 20 and the components of the memory 18 may be coupled using a local interface 22. The local interface 22 may be, for example, a data bus with accompanying control bus, a network, or other subsystem.

The spectrum access management system 10 may have various input/output (I/O) interfaces 24 as well as one or more communications interfaces 26. The interfaces 24 may be used to operatively couple the spectrum access management system 10 to various peripherals, such as a display 28, a keyboard 30, a mouse 32, etc. The communications interface 26 may include for example, a modem and/or a network interface card. The communications interface 26 may enable the spectrum access management system 10 to send and receive data signals, voice signals, video signals, and the like to and from other computing devices via the communications medium 14.

Spectrum Sharing

Techniques for granting radio devices access to shared spectrum will be described in detail. The techniques may be implemented in a manner that is independent of the specific types of radio devices 12 and the protocols used by the radio devices 12.

Figure 3:
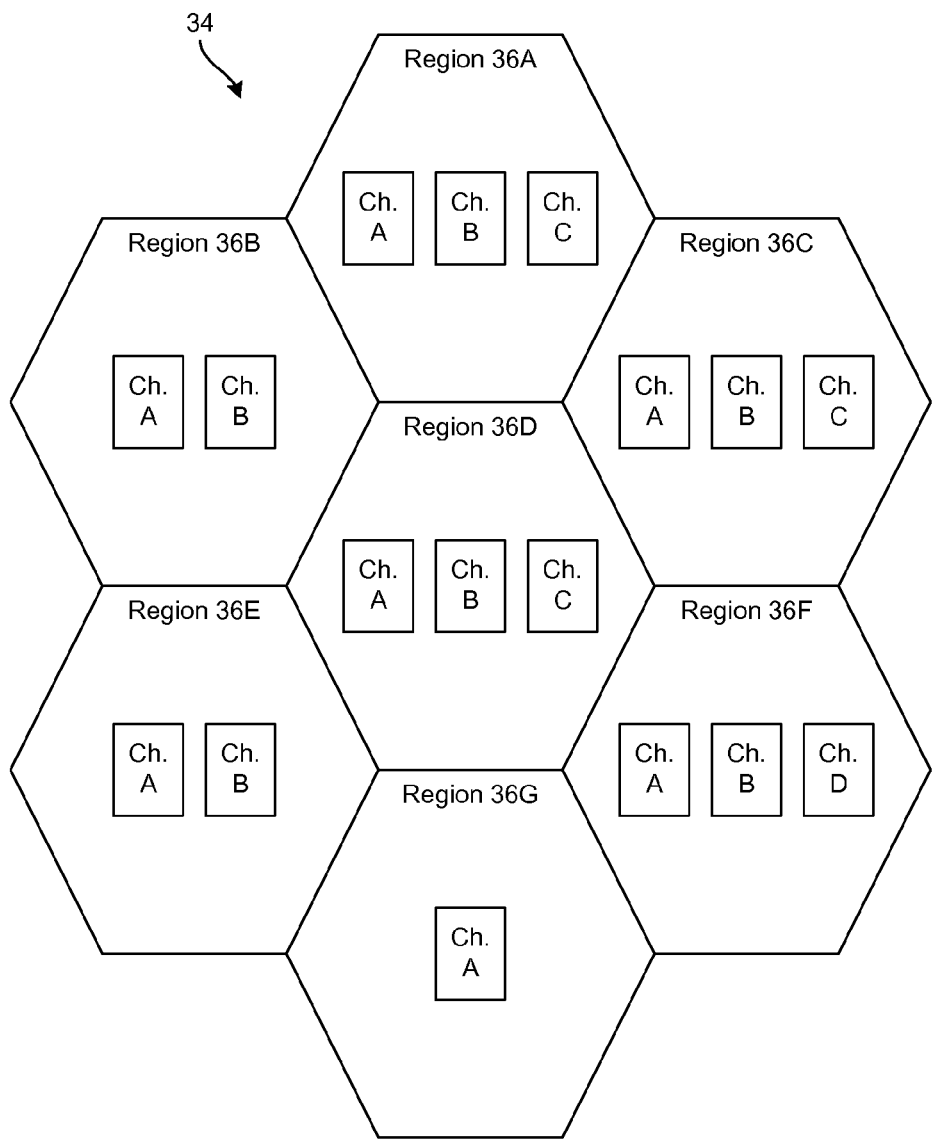
FIG. 3 is a schematic view of a geographic area that has been arranged by regions for managing spectrum access.

With additional reference to FIG. 3, a geographic area 34 over which spectrum is managed by the spectrum access management system 12 may be broken up into regions 36. In the illustrated example, there are seven regions 36, labeled with reference numerals 36A through 36G, but there may be less than seven regions 36 or more than seven regions 36 depending on the size of the geographic area 34 and the size of each region 36. In one embodiment, each geographic region 36 has a hexagon shape, but other shapes are possible. In one embodiment, each geographic region 36 has an area of about one square kilometer, but other areas are possible. Also, the shape and/or area of each region 36 need not be the same. For instance, the regions 36 may be arranged using FCC license area boarders, such as major trading areas (MTAs), basic trading areas (BTAs), cellular market areas (CMAs), etc. Alternatively, the regions 36 may be based on city boundaries, postal codes, or other designation.

Within each region 36, there may be one or more channels that are managed by the spectrum access management system 12. For instance, and for purposes of description using the illustrated example, hypothetical channels A, B and C are managed in regions 36A, 36C and 36D, hypothetical channels A and B are managed in regions 36B and 36E, hypothetical channels A, B and D are managed in region 36F, and hypothetical channel A is managed in region 36G. The managed spectrum for a region 36 may be referred to as a resource pool.

The channels managed by the spectrum access management system 12 may be any channel that a licensee is willing to share with non-licensees and/or may be an unlicensed channel. Also, a channel may refer to a collection of one or more frequency bands that are contiguous in frequency or non-contiguous in frequency. One example channel may correspond to one or more public safety bands or one or more national defense (e.g., military or department of defense) bands. Another exemplary channel may correspond to an unlicensed white space band (e.g., a TV white space). Another exemplary channel may correspond to spectrum licensed to a commercial enterprise.

Figure 4:
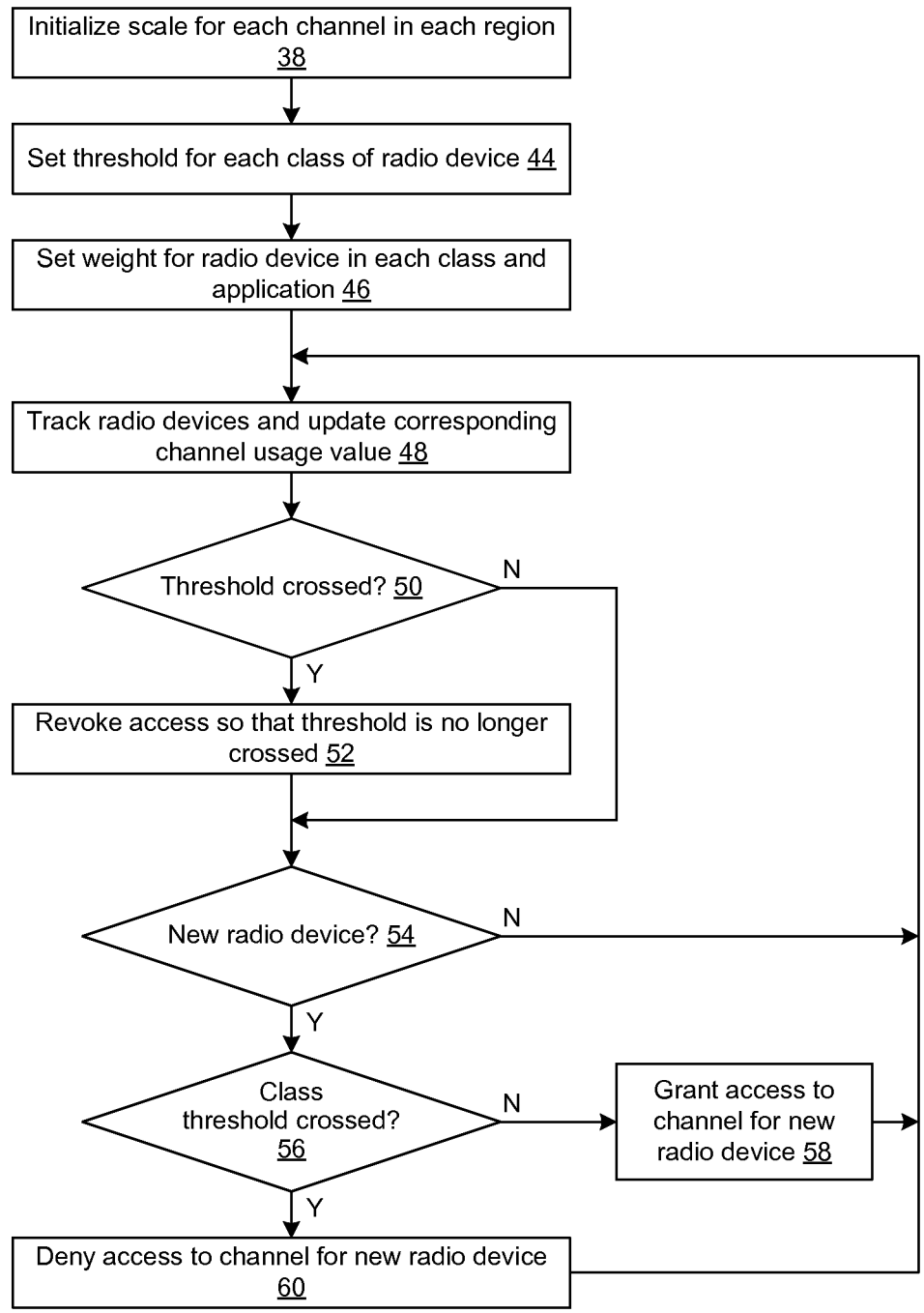
FIG. 4 is an exemplary process flow for managing spectrum access.

With additional reference to FIG. 4, illustrated are logical operations to implement an exemplary method of managing spectrum access. Portions of the exemplary method may be carried out by executing the spectrum sharing function 16. Thus, the flow chart of FIG. 4 may be thought of as depicting steps of a method carried out by the spectrum access management system 10. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted.

Figure 5:
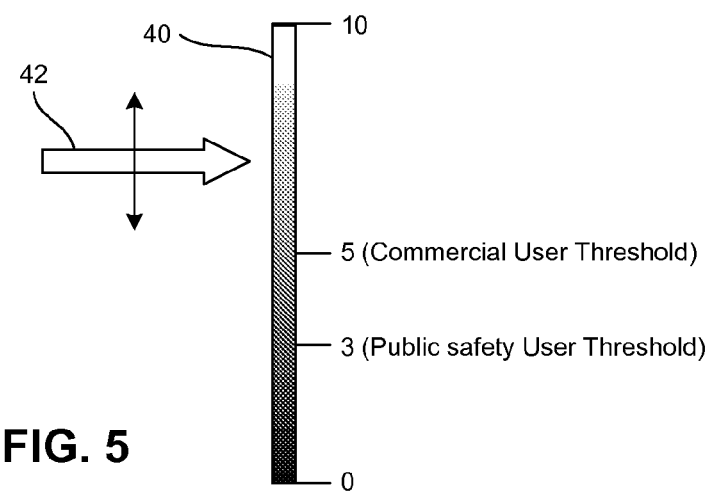
FIG. 5 is a schematic view of a spectrum management scale for a spectrum channel in a region.

The logical flow may begin block 38 where a scale is initialized for each channel in each region. An exemplary scale 40 for an exemplary channel corresponding to spectrum allocated to public safety personnel is illustrated in FIG. 5. The scale 40 may be referred by other terms, such as a slider or as a pendulum. In the illustrated embodiment, the scale 40 has a range of zero to ten and a current value, or channel usage value, is represented by a pointer 42 that moves up and down the scale 40 based on usage of the corresponding channel's spectrum by the radio devices 12, as described in greater detail below. Briefly, the channel usage value is a function of the number of radio devices 12 using the spectrum, the class to which the radio devices 12 belong, and the type of spectrum use for which the radio devices 12 are engaged.

In block 44, a threshold may be set for each class of radio device 12. In general, a class of radio devices 12 having a lowest priority will receive the highest threshold and a class of radio devices 12 having a highest priority will receive the lowest threshold. The threshold is a threshold at which no new radio device 12 belonging to the corresponding class of radio devices 12 will be granted access to use the spectrum for the channel. The thresholds may be set by human action and may be altered at any time. Also, the thresholds may be automatically altered based on a triggering event, such as a public safety emergency. In the illustrated example using the scale 40 that ranges from zero to ten, an exemplary threshold of five has been established for commercials users of the spectrum (or half of the range of the scale). Also, an exemplary threshold of three has been established for public safety users of the spectrum. In another example where the spectrum is spectrum that is licensed to a commercial enterprise that provides communications services to subscribers, the subscribers (representing one class of users) may have a first threshold (e.g., a scale value of two) and non-subscribers (representing another class of users) may have a second threshold (e.g., a scale value of six).

It will be appreciated that the foregoing threshold examples are arbitrarily selected for use in prophetic examples and could differ based on actual implementation, user weights that influence the pointer position (described below), and preferences established by a user of the spectrum access management system or established by a license holder of the spectrum.

In block 46, weights for each radio device 12 in each class may be established. The weight of each radio device 12 that is using the spectrum contributes to the position of the pointer 42, which is the channel usage value. To use an analogy, each radio device 12 has a physical weight that downwardly burdens the pointer 42 to move the pointer away from the maximum value of the scale 40 toward the minimum value of the scale 40.

The weight may be further based on the type of application for which the radio device 12 is engaged. For instance, a commercial user that is engaged in voice communications or is in a standby mode may have a standard commercial user weight while a commercial user that is engaged in Internet browsing or downloading video files may have an intensive commercial user weight that is higher than the standard commercial user weight. Radio devices 12 classified as commercial users may switch between the various commercial user weights as the radio devices 12 are used for different purposes. As another example, radio devices 12 that are classified as public safety users may have a standard public safety user weight under ordinary circumstances and may have an event-related public safety user weight when responding to an emergency. The event-related weight may be higher than the standard weight and may be assigned to radio devices 10 of emergency personnel involved in responding to an incident and not assigned to radio devices 12 of other public safety personnel. The higher user weight for each class of radio device 12 may be considered an accelerator that "brings down" the value of the pointer 42 at a faster rate than the lower or standard weight. Therefore, the higher user weight may simply be a numerical value that is higher than a numerical value of the standard user weight or may be implemented as a multiplier that increases the standard user weight.

Table 1 contains an exemplary set of weights for commercial user radio devices 12 and public safety personnel radio devices 12 where the channel undergoing management by the spectrum access management system 12 is a public safety channel.

TABLE 1

| Radio Device Class | Standard Commercial User | Intensive Commercial User | Public Safety User | Event-related Public Safety User |
|---|---|---|---|---|
| Weight Value | 0.005 | 0.010 | 0.010 | 0.100 |

Table 2 contains an exemplary set of weights for subscribing and non-subscribing commercial user radio devices 12 where the channel undergoing management by the spectrum access management system 12 is a channel licensed to a commercial enterprise.

TABLE 2

| Radio Device Class | Standard Non-subscriber | Intensive-use Non-subscriber | Standard Subscriber | Intensive-use Subscriber |
|---|---|---|---|---|
| Weight Value | 0.001 | 0.005 | 0.01 | 0.05 |

The class assignment for an individual radio device 12 may depend on one or more factors. For example, the identity of the user of the radio device 12 may determine the class, a service or subscription for which the radio device 12 is used or logged into may determine the class, or some other criteria may determine the class. Therefore, it is possible that the class may change if there is a change in user of the radio device 12.

In block 48, the radio devices 12 that are using the channel are tracked and their respective weight values are aggregated to determine a channel usage value. The channel usage value is the position of the pointer 42 relative to the scale 40. As will be appreciated, the channel usage value is a dynamic value. If there are no radio devices 12 using the channel, then the corresponding channel usage value will be the scale's maximum value, which is ten in the illustrated example. As users employ radio devices 10 to access the spectrum resources associated with the channel and in the region 36, the "weight" of the radio devices 12, as represented by their corresponding weight values, will weigh down the scale by increasing the channel usage value. As the number of radio devices 12 increases, the channel usage value will move toward the minimum value of the scale, which is zero in the illustrated example. This approach allows for capacity to be reflected in a quantified manner and, in combination with the class thresholds, allows for capacity under each radio device class to be limited. As the aggregate of the weights of the radio devices 12 slide the scale past a class threshold, no more radio devices 12 corresponding to the class will be permitted to access the channel. Varying the weight for each class of radio device 12 will impact the rate at which the scale moves. Further, the region 36 may be assigned an accelerator factor to accelerate the impact of one or more classes of radio device 12. For instance, if the region 36 is designated as the location of an incident, then an incident multiplier may be applied to amplify the weight of public safety radio device 12 that are using or start using the channel in the region 36. This would increase the rate at which non-public safety radio devices 12 would be restricted from accessing the channel.

As an example, reference will be made to the exemplary weight values of Table 1 and the exemplary thresholds of FIG. 5. Under this scenario, if the channel usage value starts at ten and 1,000 standard commercial users engage in wireless communications using the channel, then the channel usage value will move to a value of five. That is, 1,000 times the individual weight of 0.005 per radio device 12 equals five. Therefore, the collective weight of the commercial users is five, which is subtracted from the maximum value of the scale. At this point, once the channel usage value drops below the commercial user threshold of five, no additional commercial users will be able to use this spectrum resource. Continuing with the example, if 100 public safety users also engage in wireless communications using the channel, and each have a weight of 0.01, the collective weight of the public safety radio devices 12 is one (or 100 times 0.01). This weight further reduces the channel usage value so that the combined impact of the commercial radio devices 12 and the public safety radio devices 12 moves the channel usage value to a value of four, which is less than the commercial user threshold but higher than the public safety user threshold. Therefore, additional public safety radio devices 12 may be allowed to access the channel, but additional commercial radio devices 12 would be restricted from using the channel.

Continuing with the example, if 500 of the commercial users now move out of the region 36 or stop using the channel, the channel usage value would move to 6.5, allowing new commercial radio devices 12 to access the channel. Similarly, if the number of public safety users in the region becomes reduced, the channel usage value rise more, thereby allowing even more commercial users to access the spectrum resource.

As indicated, other factors may affect the channel usage value. For instance, the activity or application of the commercial users may be monitored. This monitoring may be made by the spectrum access management system 10, but will more likely be made locally at the region 36 level (e.g., by a regional coordination device (not shown) or network infrastructure located at the region 36) or by the radio devices 12 themselves. If detection is made so that the radio device 12 is considered an intensive commercial user of the channel, then its weight will increase and have a corresponding reduction in the channel usage value. Similarly, if an intensive commercial user becomes a standard commercial user, the weight of the corresponding radio device 12 will decrease and have a corresponding increase in the channel usage value. In other embodiments, statistics may be used to estimate how many radio devices 12 should be considered standard users and how may should be considered intensive users, regardless of actual application.

Another exemplary factor that may affect the channel usage value is the occurrence of an emergency in the region to which public safety personnel respond. In one embodiment, the emergency may be designated by a human operator (e.g., at a public safety command center). Alternatively, an emergency may be automatically designated by detection of an increase in communications activity with radio devices 12 in the corresponding class of public safety users. The increase may be detected using one or both of an increase in the number of radio devices 12 accessing the channel or an increase in the spectrum usage by the radio devices 12. In this event, responding public safety weights may be employed and/or a change to one or more of the scale thresholds may be made.

In the situation where the channel corresponds to spectrum that is licensed to a commercial entity, the commercial entity may make changes that affect the channel usage value and/or may change the threshold values. For instance, if a large gathering of subscribers is expected to occur in the region (e.g., to attend a sporting event at a stadium), then the commercial entity may employ weight and/or threshold modifiers to limit use by non-subscribers.

In block 50, a determination may be made as to whether one of the thresholds has been crossed by the channel usage value. In one embodiment, the threshold for which the determination is made in block 50 is a lowest one of the thresholds. In another embodiment, the threshold for which the determination in block 50 is any one of the thresholds. As described above in connection with block 48, this may occur by the addition of radio devices 12 that use the channel, a change in usage by existing users, and/or a change in circumstances. If a positive determination is made, the logical flow may proceed to block 52 where access rights granted to radio devices 12 having a lowest priority may be revoked until the threshold is no longer crossed by the channel usage value. Determining which radio devices 12 will have access rights revoked may be made in any appropriate manner. For instance, revocation made be made in reverse order of accessing the channel (e.g., a "last-in, first-out" or LIFO approach).

In one embodiment, the operations of block 50 and 52 may not be employed so that once a radio device 12 has been granted access to the channel, a revocation will not be made.

Following block 52 or following a negative determination in block 50, the logical flow may proceed to block 54. In block 54, a determination may be made as to whether a radio device 12 seeks access to the channel. If a negative determination is made in block 54, the logical flow may return to block 48. If a positive determination is made in block 54, the logical flow may proceed to block 56.

In block 56, a determination may be made as to whether the class threshold corresponding to the class of radio devices 12 to which the radio device 12 seeking access to the channel in block 54 belongs has been crossed by the channel usage value. If a negative determination is made in block 56, the logical flow may proceed to block 58. In block 58, access to the channel may be granted to the radio device 12 in question. In one embodiment, access may be granted by transmitting a use certificate to the radio device 12. The radio device 12 may be configured to not use the channel without the use certificate. Following block 58, the logical flow may return to block 48.

If a positive determination is made in block 56, the logical flow may proceed to block 60. In block 60, access to the channel by the radio device in question may be denied. In this case, the radio device 12 may seek access to another channel that is managed by the spectrum access management system 10 or use some other channel that is available to the radio device 12. In one embodiment, the spectrum access management system 10 may suggest a different channel that would be available for use by the radio device 12, although that channel may be less preferred by the radio device 12 for cost and/or performance reasons. Following block 60, the logical flow may return to block 48.

Conclusion

As will be appreciated, the disclosed techniques for managing access to spectrum resources may allow an entity (e.g., a corporate spectrum licensee, a public safety spectrum licensee, etc.) to share spectrum with others while maintaining priority over the other users. At the same time, the spectrum may be attractive for use by those with lower priority since they may be able to use relatively inexpensive spectrum without obtaining a license or sublicense. The lower priority user would recognize that there is a risk of losing its ability to use the spectrum and may need to turn to alternative spectrum resources.

In one exemplary situation a communications service provider may use the spectrum access management system 10 to organize radio devices among multiple channels that each may be shared with other types of users. For instance, a first available channel may be a 600 MHz unlicensed TV white space that is free to use but not completely reliable, a second available channel may be a 700 MHZ shared band that is relative inexpensive but without guaranteed reliability, and a third available channel may be a 700 MHZ licensed band that is expensive but has guaranteed reliability. To minimize cost, the service provider may direct radio devices to the first two bands and observe the respective channel usage values relative to the thresholds for the radio devices. As the channel usage values approach the thresholds, the service provider may direct radio devices to the third channel to avoid potential interruption in service to any of the radio devices under the management of the service provider.

Although certain embodiments have been shown and described, it is understood that equivalents and modifications falling within the scope of the appended claims will occur to others who are skilled in the art upon the reading and understanding of this specification.

What is claimed is:

1. A method of controlling access to a spectrum resource by radio devices that are grouped into a first class and a second class, the first class having higher priority to the spectrum resource than the second class, comprising:
- setting a weight value for each radio device in the first class of radio devices;
- setting a weight value for each radio device in the second class of radio devices, the weight values of at least some of the radio devices in the second class being less than the weight values of at least some of the radio devices in the first class;
- setting a first threshold for the first class of radio devices;
- setting a second threshold for the second class of radio device;
- aggregating the weight values of radio devices that use the spectrum resource, the resulting aggregate being a channel usage value and the first threshold corresponding to a larger channel usage value than the second threshold; and
- determining if the channel usage value crosses the second threshold for the second class of radio devices and, if so, denying access to the spectrum resource for additional radio devices belonging to the second class of radio devices; and
- determining if the channel usage value crosses the first threshold for the first class of radio devices and, if so, denying access to the spectrum resource for additional radio devices belonging to the first class of radio devices.

2. The method of claim 1, wherein the spectrum resource is a channel in a known geographical region.

3. The method of claim 1, wherein, for each radio device in the second class, further comprising determining if the device is an intensive user of the spectrum resource and, for each device that is an intensive user of the spectrum resource, increasing the weight value for the radio device determined to be an intensive user of the spectrum resource.

4. The method of claim 1, further comprising revoking an access right to the spectrum resource from radio devices of the second class if the threshold for one of the classes of radio devices is crossed.

5. The method of claim 4, wherein the threshold that is crossed to revoke the access right is the threshold for the first class of radio devices.

6. The method of claim 1, wherein the spectrum resource corresponds to spectrum that is licensed to a commercial entity.

7. The method of claim 6, wherein the first class of radio devices corresponds to subscribers of a service offered by the commercial entity and the second class of radio devices corresponds to non-subscribers.

8. The method of claim 1, wherein the spectrum resource corresponds to spectrum that is allocated to public safety personnel and the first class of radio devices corresponds to radio devices of emergency responders.

9. The method of claim 8, further comprising increasing the weight value for radio devices in the first class and that are involved in responding to a public safety incident.

10. The method of claim 1, wherein the class for at least one radio device is determined according to a user of the radio device.

11. A spectrum access management system configured to control access to a spectrum resource by radio devices that are grouped into a first class and a second class, the first class having higher priority to the spectrum resource than the second class, comprising a memory for storing and a processor for executing a program that contains logical instructions to:
- set a weight value for each radio device in the first class of radio devices;
- set a weight value for each radio device in the second class of radio devices, the weight values of at least some of the radio devices in the second class being less than the weight values of at least some of the radio devices in the first class;
- set a first threshold for the first class of radio devices;
- set a second threshold for the second class of radio device;
- aggregate the weight values of radio devices that use the spectrum resource, the resulting aggregate being a channel usage value and the first threshold corresponding to a larger channel usage value than the second threshold; and
- determine if the channel usage value crosses the second threshold for the second class of radio devices and, if so, deny access to the spectrum resource for additional radio devices belonging to the second class of radio devices; and
- determine if the channel usage value crosses the first threshold for the first class of radio devices and, if so, deny access to the spectrum resource for additional radio devices belonging to the first class of radio devices.

12. The system of claim 11, wherein the spectrum resource is a channel in a known geographical region.

13. The system of claim 11, wherein, for each radio device in the second class, the system determines if the device is an intensive user of the spectrum resource and, for each device that is an intensive user of the spectrum resource, the system increases the weight value for the radio device determined to be an intensive user of the spectrum resource.

14. The system of claim 11, wherein the system revokes an access right to the spectrum resource from radio devices of the second class if the threshold for one of the classes of radio devices is crossed.

15. The system of claim 14, wherein the threshold that is crossed to revoke the access right is the threshold for the first class of radio devices.

16. The system of claim 11, wherein the spectrum resource corresponds to spectrum that is licensed to a commercial entity.

17. The system of claim 16, wherein the first class of radio devices corresponds to subscribers of a service offered by the commercial entity and the second class of radio devices corresponds to non-subscribers.

18. The system of claim 11, wherein the spectrum resource corresponds to spectrum that is allocated to public safety personnel and the first class of radio devices corresponds to radio devices of emergency responders.

19. The system of claim 18, wherein the system increases the weight value for radio devices in the first class and that are involved in responding to a public safety incident.

20. The system of claim 11, wherein the class for at least one radio device is determined according to a user of the radio device.

* * * * *